(12) United States Patent  
Luick

(10) Patent No.: US 7,937,530 B2
(45) Date of Patent: May 3, 2011

(54) METHOD AND APPARATUS FOR ACCESSING A CACHE WITH AN EFFECTIVE ADDRESS

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 11/770,036

(22) Filed: Jun. 28, 2007

(65) Prior Publication Data

US 2009/0006812 A1   Jan. 1, 2009

(51) Int. Cl.
*G06F 12/00* (2006.01)
(52) U.S. Cl. ............... 711/122; 711/E12.027; 711/3; 711/207
(58) Field of Classification Search ............ 711/205
See application file for complete search history.

(56) References Cited

U.S. PATENT DOCUMENTS

| | | | |
|---|---|---|---|
| 6,230,260 B1 | 5/2001 | Luick | |
| 6,311,253 B1 | 10/2001 | Chang et al. | |
| 6,581,140 B1 | 6/2003 | Sullivan et al. | |
| 6,871,273 B1 | 3/2005 | Moore | |
| 7,039,762 B2 | 5/2006 | Navarro et al. | |
| 7,039,768 B2 * | 5/2006 | Alexander et al. | 711/146 |
| 7,284,092 B2 * | 10/2007 | Nunamaker et al. | 711/122 |
| 7,555,605 B2 * | 6/2009 | Moyer | 711/118 |
| 7,680,985 B2 | 3/2010 | Luick | |
| 2006/0161758 A1 | 7/2006 | Bradford et al. | |
| 2006/0184747 A1 | 8/2006 | Guthrie et al. | |
| 2006/0224833 A1 | 10/2006 | Guthrie et al. | |
| 2006/0259734 A1 | 11/2006 | Sheu et al. | |
| 2009/0006753 A1 | 1/2009 | Luick | |
| 2009/0006754 A1 | 1/2009 | Luick | |
| 2009/0006803 A1 | 1/2009 | Luick | |

FOREIGN PATENT DOCUMENTS

WO      03048942 A2    6/2003

OTHER PUBLICATIONS

Wang et al, "Organization and Performance of a Two-Level Virtual-Real Cache Hierarchy", Computer Architecture News, ACM, New York, NY, US, vol. 17, No. 3, Jun. 1, 1989, pp. 140-148.
Office Action History of U.S. Appl. No. 11/769,978, dated May 3, 2010.
Office Action History of U.S. Appl. No. 12/048,404, dated May 17, 2010.
Office Action History of U.S. Appl. No. 12/048,041, dated May 17, 2010.

(Continued)

*Primary Examiner* — Reginald G Bragdon
*Assistant Examiner* — Hamdy S Ahmed
(74) *Attorney, Agent, or Firm* — Patterson & Sheridan LLP

(57) ABSTRACT

A method and apparatus for accessing a processor cache. The method includes executing an access instruction in a processor core of the processor. The access instruction provides an untranslated effective address of data to be accessed by the access instruction. The method also includes determining whether a level one cache for the processor core includes the data corresponding to the effective address of the access instruction. The effective address of the access instruction is used without address translation to determine whether the level one cache for the processor core includes the data corresponding to the effective address. If the level one cache includes the data corresponding to the effective address, the data for the access instruction is provided from the level one cache.

11 Claims, 10 Drawing Sheets

OTHER PUBLICATIONS

Office Action History of U.S. Appl. No. 11/770,099, dated Oct. 30, 2009.

Office Action history of U.S. Appl. No. 11/769,978, dated Sep. 14, 2010.

Office Action history of U.S. Appl. No. 12/048,404 dated Sep. 17, 2010.

Office Action history of U.S. Appl. No. 12/048,041 dated Sep. 17, 2010.

* cited by examiner

METHOD AND APPARATUS FOR ACCESSING A CACHE WITH AN EFFECTIVE ADDRESS

CROSS-REFERENCE TO RELATED APPLICATIONS

This application is related to U.S. patent application Ser. No. 11/769,978, entitled L2 CACHE/NEST ADDRESS TRANSLATION, filed Jun. 28, 2007, by David Arnold Luick; and U.S. patent application Ser. No. 11/770,099, entitled METHOD AND APPARATUS FOR ACCESSING A SPLIT CACHE DIRECTORY, filed Jun. 28, 2007, by David Arnold Luick. These related patent applications are herein incorporated by reference in their entirety.

BACKGROUND OF THE INVENTION

1. Field of the Invention

The present invention generally relates to executing instructions in a processor.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core.

To provide for faster access to data and instructions as well as better utilization of the processor, the processor may have several caches. A cache is a memory which is typically smaller than the main memory and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2 Cache (L2 cache). In some cases, the processor may have other, additional cache levels (e.g., an L3 cache and an L4 cache).

Modern processors provide address translation which allows a software program to use a set of effective addresses to access a larger set of real addresses. During an access to a cache, an effective address provided by a load or a store instruction may be translated into a real address and used to access the L1 cache. Thus, the processor may include circuitry configured to perform the address translation before the L1 cache is accessed by the load or the store instruction. However, because of the address translation, access time to the L1 cache may be increased. Furthermore, where the processor includes multiple cores which each perform address translation, the overhead from providing address translation circuitry and performing address translation while executing multiple programs may become undesirable.

Accordingly, what is needed is an improved method and apparatus for accessing a processor cache.

SUMMARY OF THE INVENTION

The present invention generally provides a method and apparatus for accessing a processor cache. In one embodiment, the method includes executing an access instruction in a processor core of the processor. The access instruction provides an untranslated effective address of data to be accessed by the access instruction. The method also includes determining whether a level one cache for the processor core includes the data corresponding to the effective address of the access instruction. The effective address of the access instruction is used without address translation to determine whether the level one cache for the processor core includes the data corresponding to the effective address. If the level one cache includes the data corresponding to the effective address, the data for the access instruction is provided from the level one cache.

One embodiment of the invention provides a processor including a processor core, a level one cache, and circuitry. The circuitry is configured to execute an access instruction in the processor core of the processor. The access instruction provides an untranslated effective address of data to be accessed by the access instruction. The circuitry is also configured to determine whether the level one cache for the processor core includes the data corresponding to the effective address of the access instruction. The effective address of the access instruction is used without address translation to determine whether the level one cache for the processor core includes the data corresponding to the effective address. If the level one cache includes the data corresponding to the effective address, the data for the access instruction is provided from the level one cache.

One embodiment of the invention also provides a processor including a processor core, a level one cache, a level two cache and a translation lookaside buffer. The translation lookaside buffer includes a corresponding entry indicating a data effective address and a corresponding data real address for each valid line of data in the level one cache. The processor also includes level one cache circuitry configured to execute an access instruction in the processor core of the processor. The access instruction provides an untranslated effective address of data to be accessed by the access instruction. The level one cache circuitry is also configured to determine whether the level one cache for the processor core includes the data corresponding to the effective address of the access instruction. The effective address of the access instruction is used without address translation to determine whether the level one cache for the processor core includes the data corresponding to the effective address. If the level one cache includes the data corresponding to the effective address, the data for the access instruction is provided from the level one cache. If the level one cache does not include the data corresponding to the effective address, the data is accessed using the level two cache and the translation lookaside buffer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
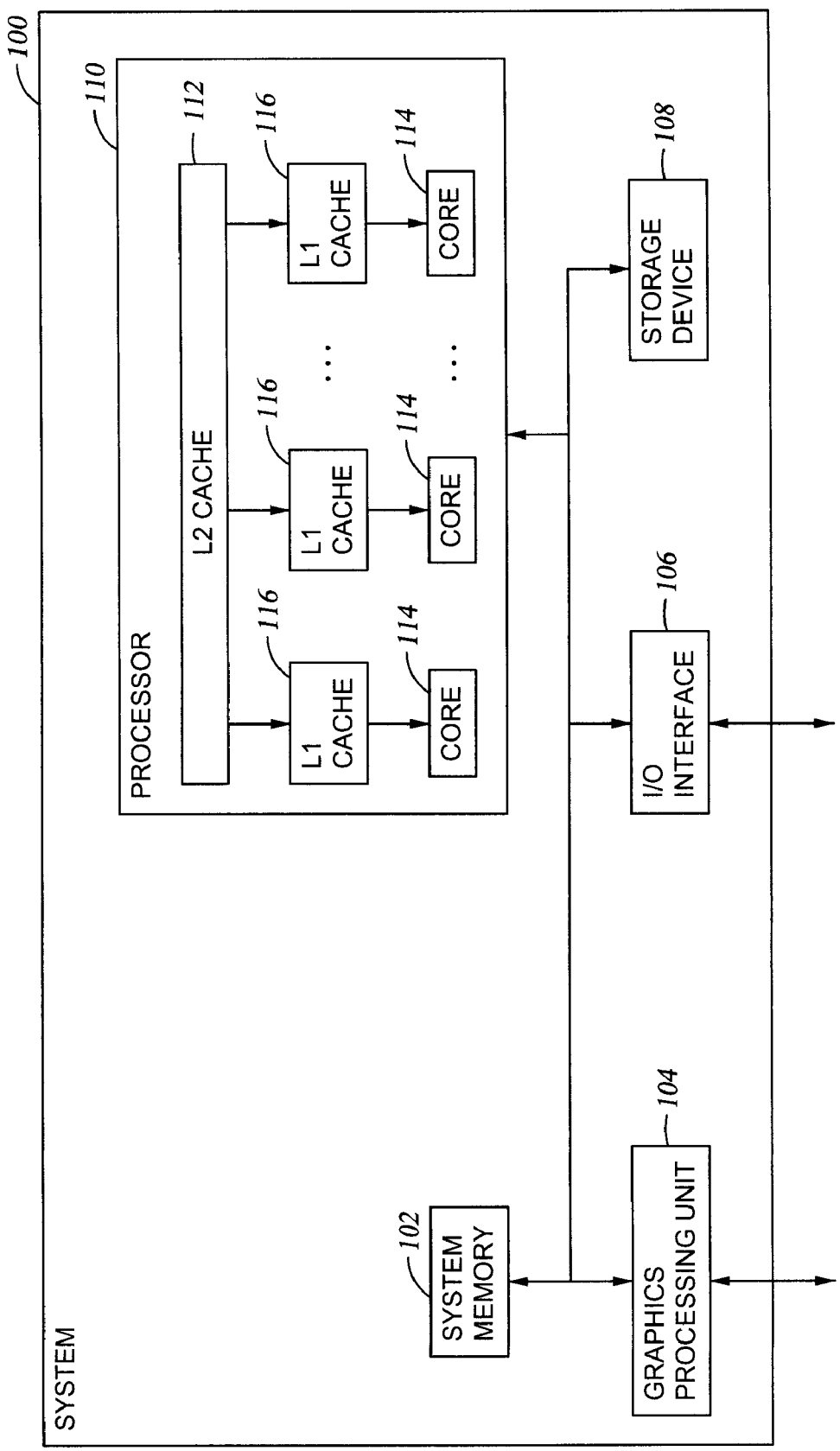
FIG. 1 is a block diagram depicting a system according to one embodiment of the invention.

The present invention generally provides a method and apparatus for accessing a processor cache. In one embodiment, the method includes executing an access instruction in a processor core of the processor. The access instruction provides an untranslated effective address of data to be accessed by the access instruction. The method also includes determining whether a level one cache for the processor core includes the data corresponding to the effective address of the access instruction. The effective address of the access instruction is used without address translation to determine whether the level one cache for the processor core includes the data corresponding to the effective address. If the level one cache includes the data corresponding to the effective address, the data for the access instruction is provided from the level one cache. In some cases, by accessing the level one cache with an effective address, processing overhead caused by address translation may be removed during level one cache accesses, thereby increasing the speed and reducing the power with which a processor accesses the level one cache.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

While described below with respect to a processor having multiple processor cores and multiple L1 caches, wherein each processor core uses multiple pipelines to execute instructions, embodiments of the invention may be utilized with any processor which utilizes a cache, including processors which have a single processing core. In general, embodiments of the invention may be utilized with any processor and are not limited to any specific configuration. Furthermore, while described below with respect to a processor having an L1-cache divided into an L1 instruction cache (L1 I-cache, or I-cache) and an L1 data cache (L1 D-cache, or D-cache), embodiments of the invention may be utilized in configurations wherein a unified L1 cache is utilized. Also, while described below with respect to an L1 cache which utilizes an L1 cache directory, embodiments of the invention may be utilized wherein a cache directory is not used.

Overview of an Exemplary System

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
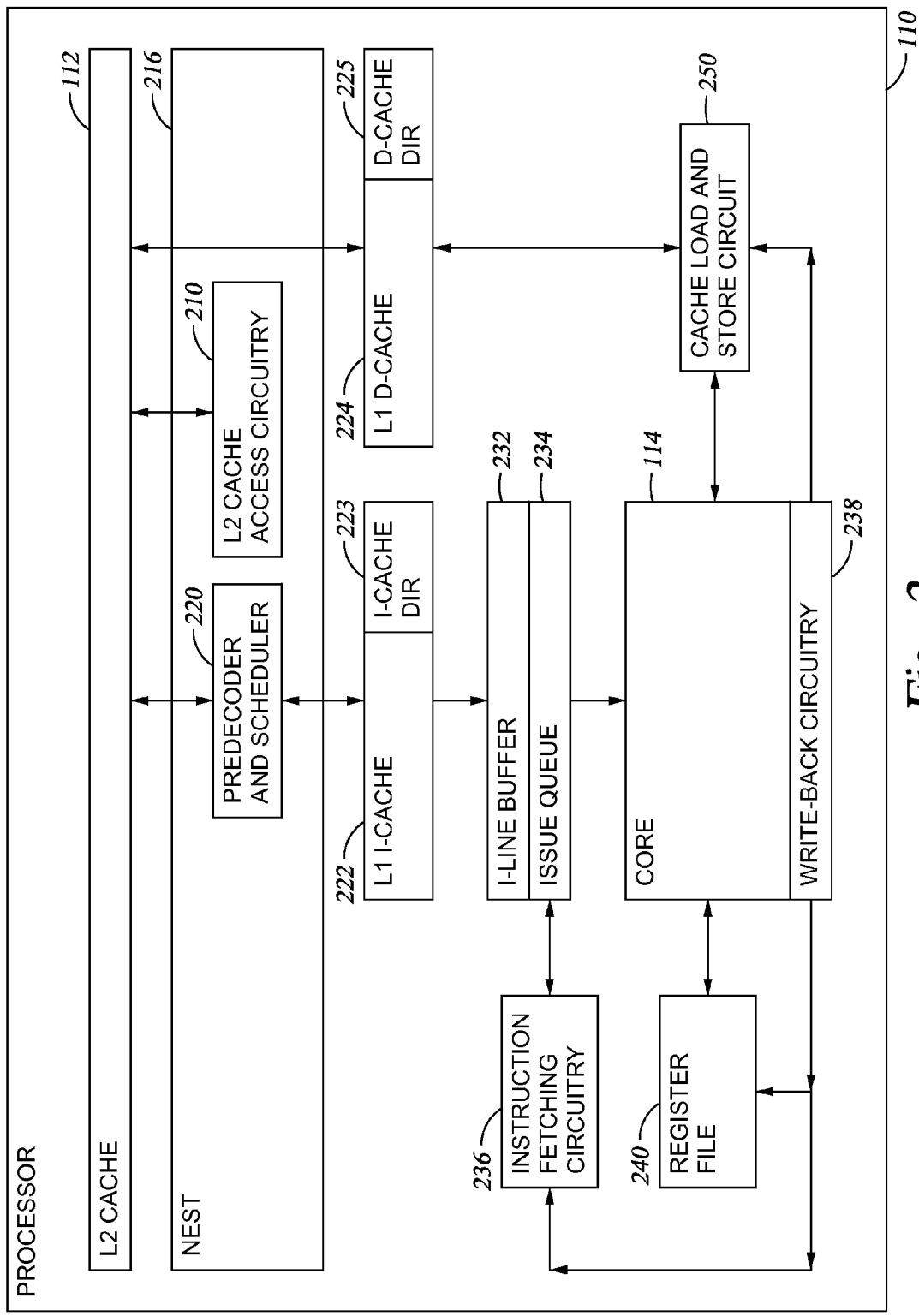
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., contain identical pipelines with identical pipeline stages). In another embodiment, each core 114 may be different (e.g., contain different pipelines with different stages).

In one embodiment of the invention, the L2 cache 112 may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache 112.

As described above, in some cases, the L2 cache 112 may be shared by the one or more processor cores 114, each using a separate L1 cache 116. In one embodiment, the processor 110 may also provide circuitry in a nest 216 which is shared by the one or more processor cores 114 and L1 caches 116. Thus, when a given processor core 114 requests instructions from the L2 cache 112, the instructions may be first processed by a predecoder and scheduler 220 in the nest 216 which is shared among the one or more processor cores 114. The nest 216 may also include L2 cache access circuitry 210, described in greater detail below, which may be used by the one or more processor cores 114 to access the shared L2 cache 112.

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using the L2 access circuitry 210.

I-lines retrieved from the L2 cache 112 may be processed by the predecoder and scheduler 220 and the I-lines may be placed in the I-cache 222. To further improve processor performance, instructions may be predecoded, for example, when the I-lines are retrieved from L2 (or higher) cache and before the instructions are placed in the L1 cache 116. Such predecoding may include various functions, such as address generation, branch prediction, and scheduling (determining an order in which the instructions should be issued), which is captured as dispatch information (a set of flags) that control instruction execution. Embodiments of the invention may also be used where decoding is performed at another location in the processor 110, for example, where decoding is performed after the instructions have been retrieved from the L1 cache 116.

In some cases, the predecoder and scheduler 220 may be shared among multiple cores 114 and L1 caches 116. Similarly, D-lines fetched from the L2 cache 112 may be placed in the D-cache 224. A bit in each I-line and D-line may be used to track whether a line of information in the L2 cache 112 is an I-line or D-line. Optionally, instead of fetching data from the L2 cache 112 in I-lines and/or D-lines, data may be fetched from the L2 cache 112 in other manners, e.g., by fetching smaller, larger, or variable amounts of data.

In one embodiment, the I-cache 222 and D-cache 224 may have an I-cache directory 223 and D-cache directory 225 respectively to track which I-lines and D-lines are currently in the I-cache 222 and D-cache 224. When an I-line or D-line is added to the I-cache 222 or D-cache 224, a corresponding entry may be placed in the I-cache directory 223 or D-cache directory 225. When an I-line or D-line is removed from the I-cache 222 or D-cache 224, the corresponding entry in the I-cache directory 223 or D-cache directory 225 may be removed. While described below with respect to a D-cache 224 which utilizes a D-cache directory 225, embodiments of the invention may also be utilized where a D-cache directory 225 is not utilized. In such cases, the data stored in the D-cache 224 itself may indicate what D-lines are present in the D-cache 224.

In one embodiment, instruction fetching circuitry 236 may be used to fetch instructions for the core 114. For example, the instruction fetching circuitry 236 may contain a program counter which tracks the current instructions being executed in the core 114. A branch unit within the core 114 may be used to change the program counter when a branch instruction is encountered. An I-line buffer 232 may be used to store instructions fetched from the L1 I-cache 222. The issue queue 234 and associated circuitry may be used to group instructions in the I-line buffer 232 into instruction groups which may then be issued in parallel to the core 114 as described below. In some cases, the issue queue 234 may use information provided by the predecoder and scheduler 220 to form appropriate instruction groups.

In addition to receiving instructions from the issue queue 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) before the D-cache access is completed.

In some cases, data may be modified in the core 114. Modified data may be written to the register file 240, or stored in memory 102. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, the write-back circuitry 238 may also be used to write instructions back to the I-cache 222.

As described above, the issue queue 234 may be used to form instruction groups and issue the formed instruction groups to the core 114. The issue queue 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Figure 3:
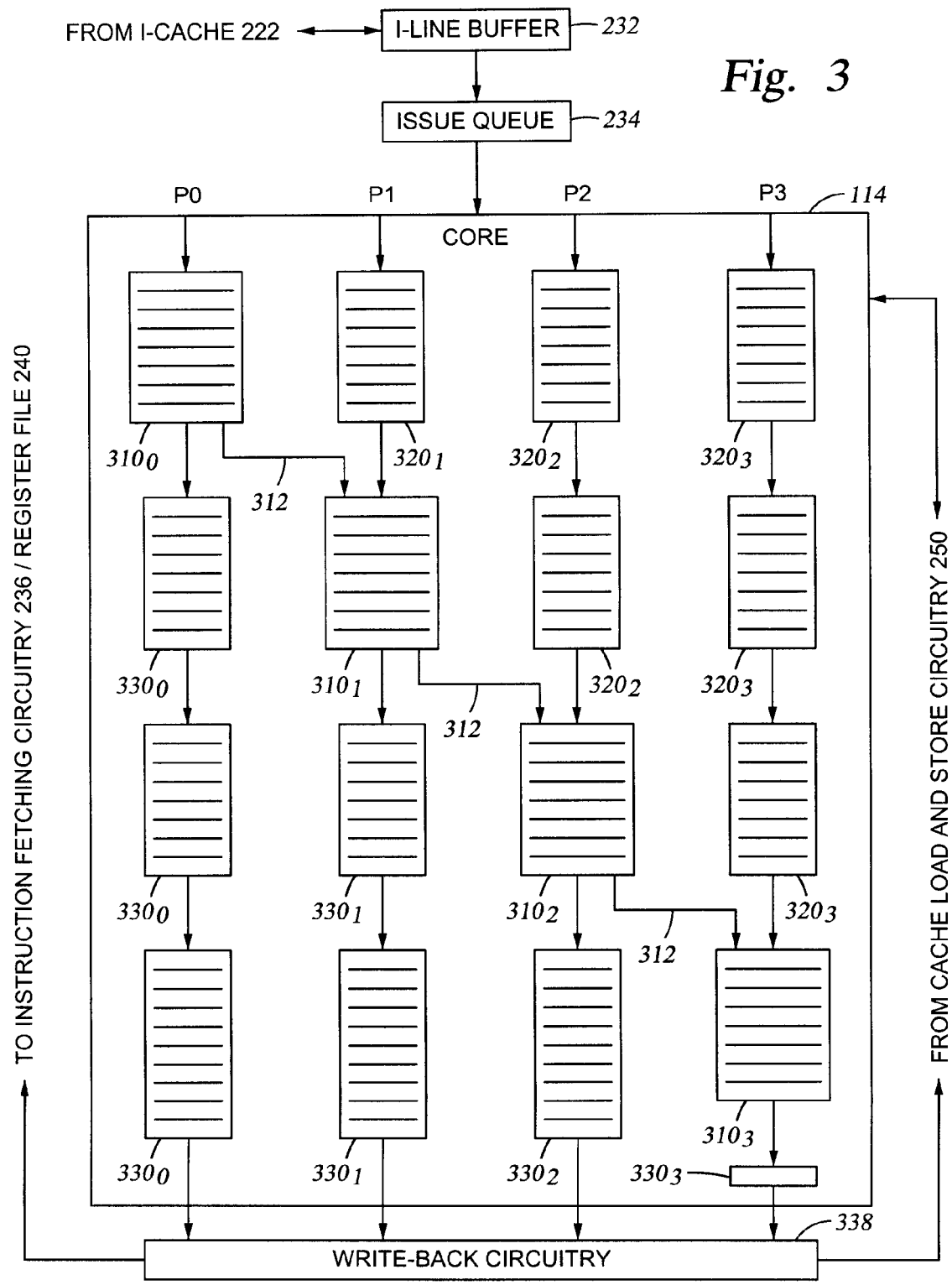
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, and P3) in the cascaded, delayed execution pipeline configuration may contain an execution unit 310. The execution unit 310 may perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit 310 may also read data from a register file 240, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry 238, as well as any other circuitry, to perform these functions.

In one embodiment, each execution unit 310 may perform the same functions (e.g., each execution unit 310 may be able to perform load/store functions). Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where four instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on. I0 may be executed immediately in execution unit $310_0$. Later, after instruction I0 has finished being executed in execution unit $310_0$, execution unit $310_1$ may begin executing instruction I1, and so one, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions not being executed by an execution unit 310 may be held in a delay queue 320 or a target delay queue 330. The delay queues 320 may be used to hold instructions in an instruction group which have not been executed by an execution unit 310. For example, while instruction I0 is being executed in execution unit $310_0$, instructions I1, I2, and I3 may be held in a delay queue 330. Once the instructions have moved through the delay queues 330, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 306 may be used to write back the most recently modified value of a register and discard invalidated results.

Accessing Cache Memory

In one embodiment of the invention, the L1 cache 116 for each processor core 114 may be accessed using effective addresses. Where the L1 cache 116 uses a separate L1 I-cache 222 and L1 D-cache 224, each of the caches 222, 224 may also be accessed using effective addresses. In some cases, by accessing the L1 cache 116 using effective addresses provided directly by instructions being executed by the processor core 114, processing overhead caused by address translation may be removed during L1 cache accesses, thereby increasing the speed and reducing the power with which the processor core 114 accesses the L1 cache 116.

In some cases, multiple programs may use the same effective addresses to access different data. For example, a first program may use a first address translation which indicates that a first effective address EA1 is used to access data corresponding to a first real address RA1. A second program may use a second address translation to indicate that EA1 is used to access a second real address RA2. By using different address translations for each program, the effective addresses for each of the programs may be translated into different real addresses in a larger real address space, thereby preventing the different programs from inadvertently accessing the incorrect data. The address translations may be maintained, for example, in a page table in system memory 102. The portion of the address translation used by the processor 110 may be cached, for example, in a lookaside buffer such as a translation lookaside buffer or a segment lookaside buffer.

In some cases, because data in the L1 cache 116 may be accessed using effective addresses, there may be a desire to prevent different programs which use the same effective addresses from inadvertently accessing incorrect data. For example, if the first program uses EA1 to access the L1 cache 116, an address also used by the second program to refer to RA2, the first program should receive data corresponding to RA1 from the L1 cache 116, not data corresponding to RA2.

Accordingly, in one embodiment of the invention, the processor 110 may ensure that, for each effective address being used in the core 114 of the processor 110 to access the L1 cache 116 for that core 114, the data in the L1 cache 116 is the correct data for the address translation used by the program that is being executed. Thus, where the lookaside buffer used by the processor 110 contains an entry for the first program indicating that the effective address EA1 translates into the real address RA1, the processor 110 may ensure that any data in the L1 cache 116 marked as having effective address EA1 is the same data stored at real address RA1. Where the address translation entry for EA1 is removed from the lookaside buffer, the corresponding data, if any, may also be removed from the L1 cache 116, thereby ensuring that all of the data in the L1 cache 116 has a valid translation entry in the lookaside buffer. By ensuring that all the data in the L1 cache 116 is mapped by a corresponding entry in the lookaside buffer used for address translation, the L1 cache 116 may be accessed using effective addresses while preventing a given program from inadvertently receiving incorrect data from the L1 cache 116.

Figure 4:
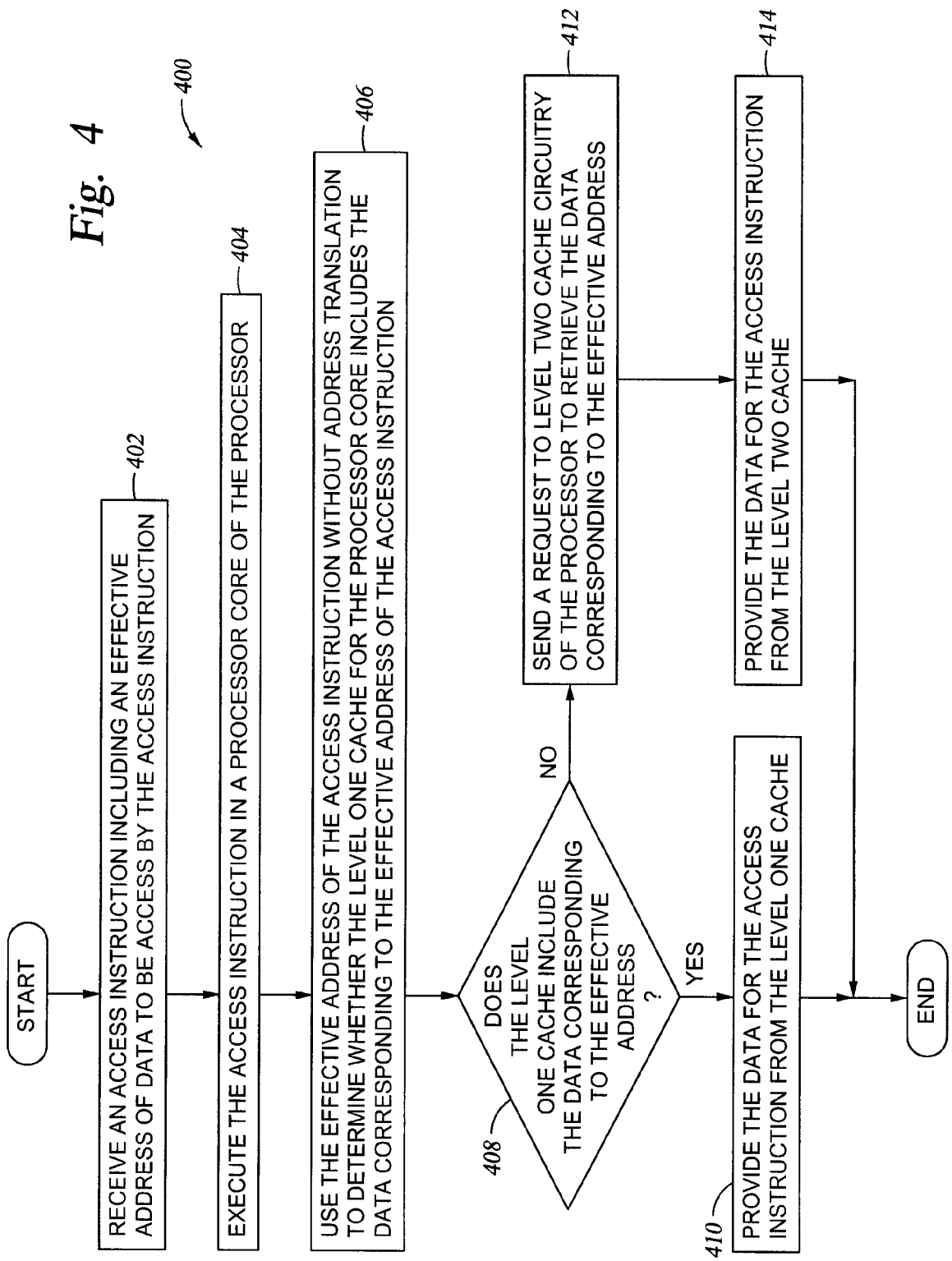
FIG. 4 is a flow diagram depicting a process for accessing a cache according to one embodiment of the invention.

FIG. 4 is a flow diagram depicting a process 400 for accessing an L1 cache 116 (e.g., D-cache 224) according to one embodiment of the invention. The process 400 may begin at step 402 where an access instruction including an effective address of data to be accessed by the access instruction is received. The access instruction may be a load or a store instruction received by the processor core 114. At step 404, the access instruction may be executed by the processor core 114, for example, in one of the execution units 310 with load-store capabilities.

At step 406, the effective address of the access instruction may be used without address translation to determine whether the L1 cache 116 for the processor core 114 includes the data corresponding to the effective address of the access instruction. If, at step 408, a determination is made that the L1 cache 116 includes data corresponding to the effective address, then the data for the access may be provided from the L1 cache 116 at step 410. If, however, a determination is made at step 408 that the L1 cache 116 cache does not include the data, then at step 412 a request may be sent to the L2 cache access circuitry 210 to retrieve the data corresponding to the effective address. The L2 cache access circuitry 210 may, for example, fetch the data from the L2 cache 112 or retrieve the data from higher levels of the cache memory hierarchy, e.g., from system memory 102, and place the retrieved data in the L2 cache 112. The data for the access instruction may then be provided from the L2 cache 112 at step 414.

Figure 5:
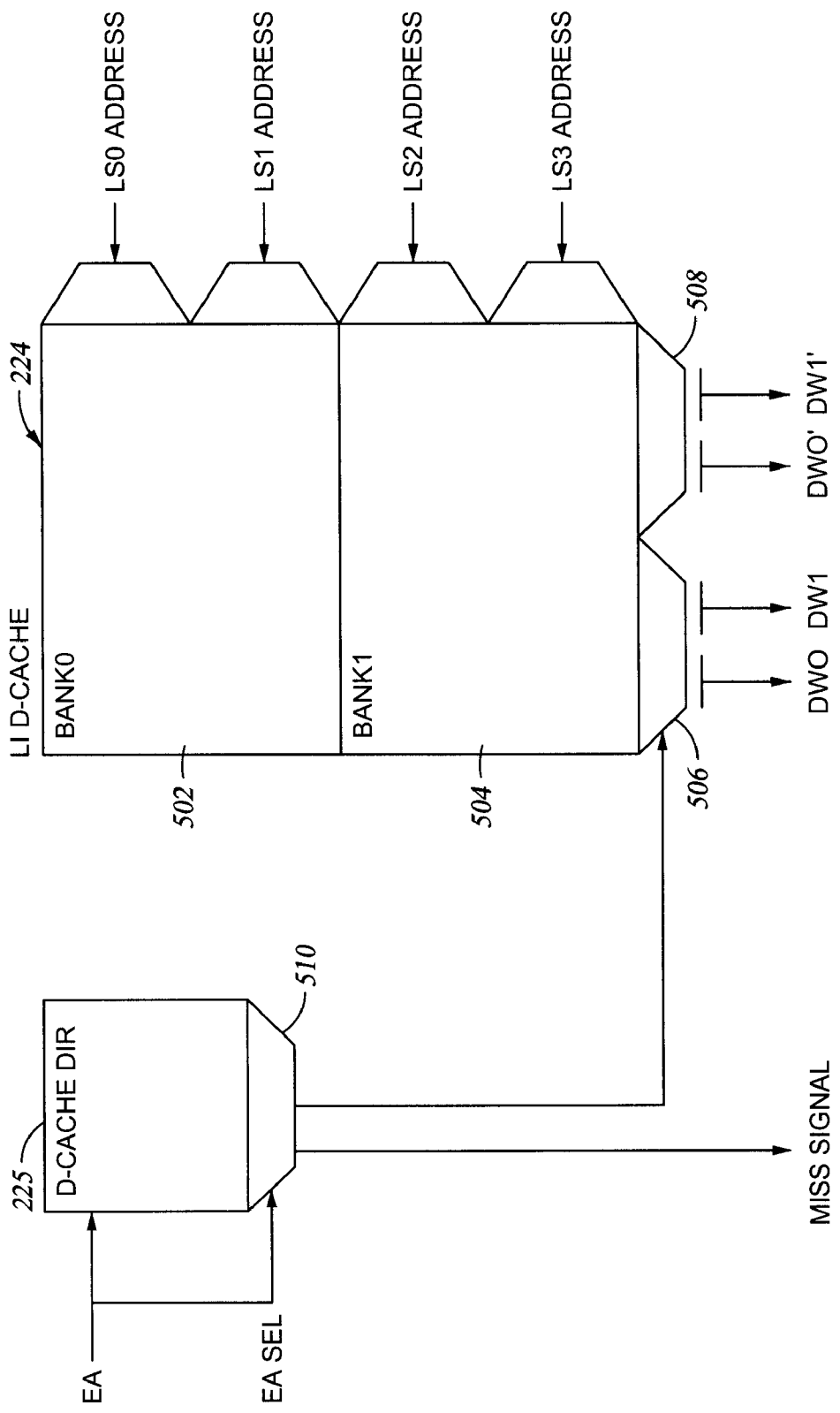
FIG. 5 is a block diagram depicting a cache according to one embodiment of the invention.

FIG. 5 is a block diagram depicting circuitry for accessing an L1 D-cache 224 using effective addresses according to one embodiment of the invention. As mentioned above, embodiments of the invention may also be used where a unified L1 cache 116 or an L1 I-cache 222 are accessed with an effective address. In one embodiment, the L1 D-cache 224 may include multiple banks such as BANK0 502 and BANK1 504. The L1 D-cache 224 may also include multiple ports which may be used, for example, to read two quadruple words or four double words (DW0, DW1, DW0', DW1') according to load-store effective addresses (LS0, LS1, LS2, LS3) applied to the L1 D-cache 224. The L1 D-cache 224 may be a direct mapped, set associative, or fully associative cache.

In one embodiment, the D-cache directory 225 may be used to access the L1 D-cache 224. For example, an effective address EA for requested data may be provided to the directory 225. The directory 225 may also be direct mapped, set associative, or fully associative cache. Where the directory 225 is associative, a portion of the effective address (EA SEL) may be used by select circuitry 510 for the directory 225 to access information about the requested data. If the directory 225 does not contain an entry corresponding to the effective address of requested data, then the directory 225 may assert a miss signal which may be used, for example, to request data from higher levels of the cache hierarchy (e.g., from the L2 cache 112 or from system memory 102). If, however, the directory 225 does contain an entry corresponding to the effective address of the requested data, then the entry may be used by selection circuitry 506, 508 of the L1 D-cache 224 to provide the requested data.

In one embodiment of the invention, the L1 cache 116, L1 D-cache 224, and/or L1 I-cache 222 may also be accessed using a split cache directory. For example, by splitting access to the cache directory, an access to the directory may be performed more quickly, thereby improving performance of the processor 110 when accessing the cache memory system. While described above with respect to accessing a cache with effective addresses, the split cache directory may be used with any cache level (e.g., L1, L2, etc.) which is accessed with any type of address (e.g., real or effective).

Figure 6A:
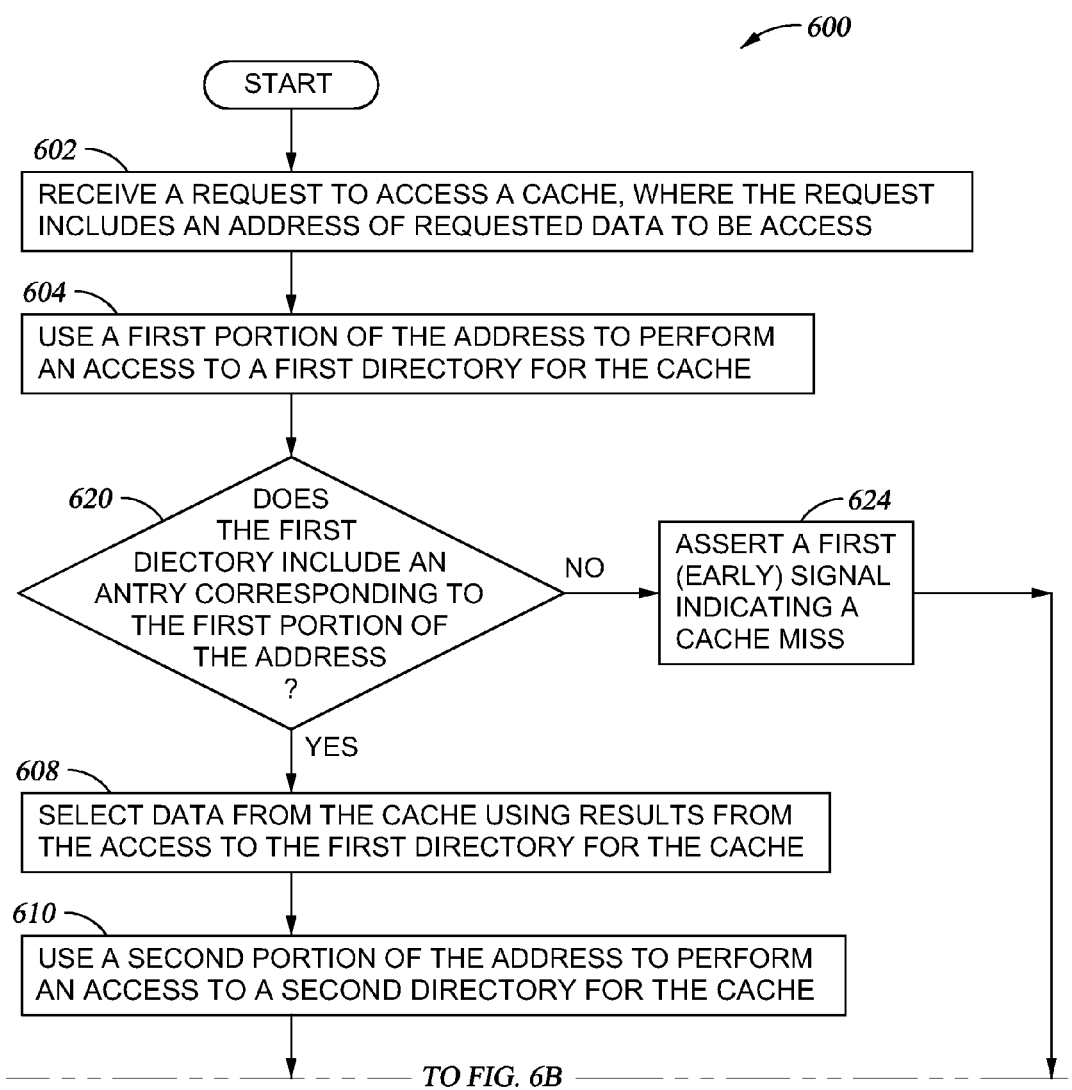
FIG. 6 is a flow diagram depicting a process for accessing a cache using a split directory according to one embodiment of the invention.
Figure 6B:
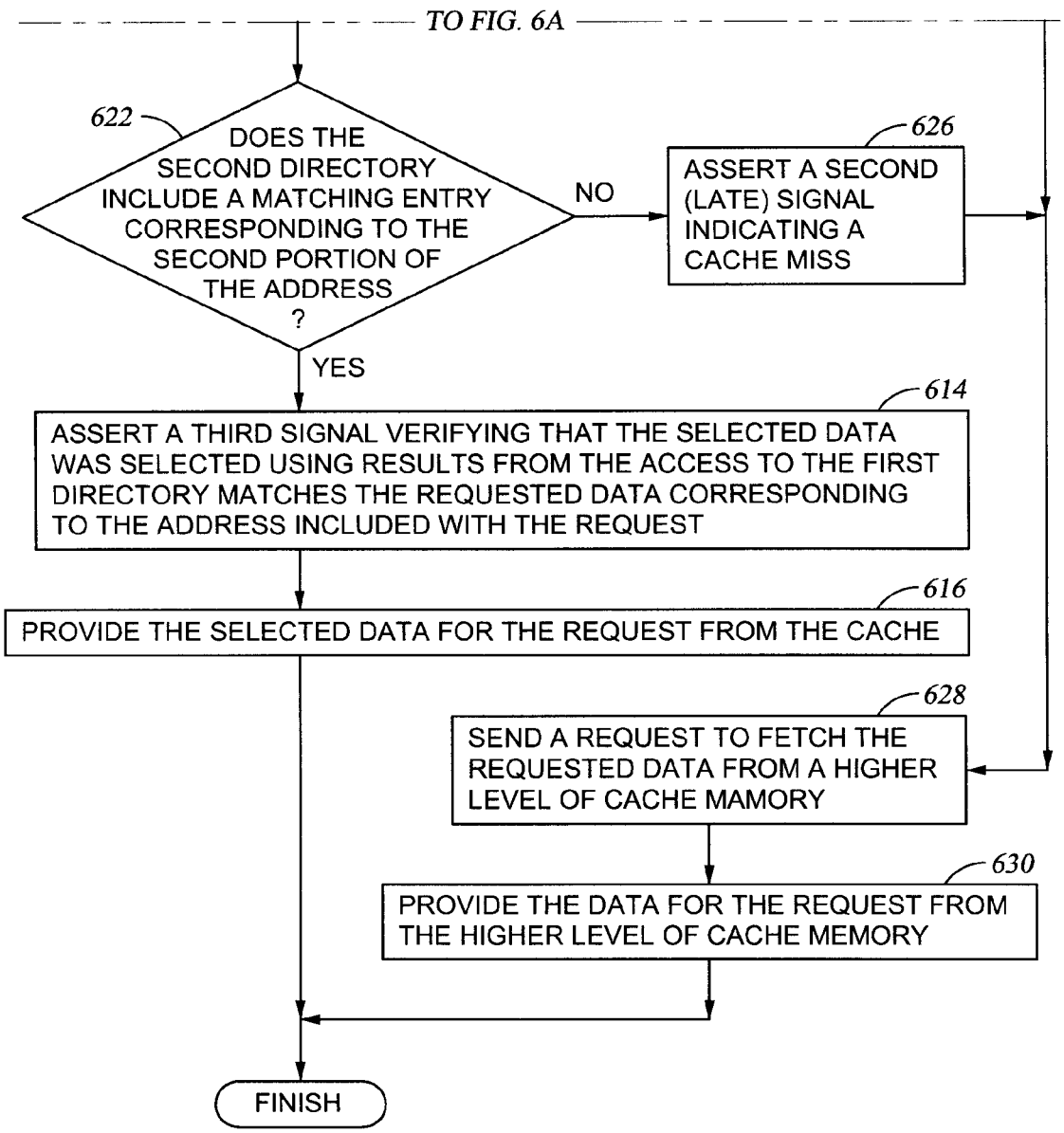

FIG. 6 is a flow diagram depicting a process 600 for accessing a cache using a split directory according to one embodiment of the invention. The process 600 may begin at step 602 where a request to access a cache is received. The request may include an address (e.g., real or effective) of an address to be accessed. At step 604, a first portion (e.g., higher order bits, or, alternatively, lower order bits) of the address may be used to perform an access to a first directory for the cache. Because the first directory may be accessed with a portion of the address, the size of the first directory may be reduced, thereby allowing the first directory to be accessed more quickly than a larger directory.

At step 620, a determination may be made of whether the first directory includes an entry corresponding to the first portion of the address of the requested data. If a determination is made that the directory does not include an entry for the first portion, then a first signal indicating a cache miss may be asserted at step 624. In response to detecting the first signal indicating the cache miss, a request to fetch the requested data may be sent to higher levels of cache memory at step 628. As described above, because the first directory is smaller and may be accessed more quickly than a larger directory, the determination of whether to assert the first signal indicating the cache miss and begin fetching the memory from higher levels of cache may be made more quickly. Because of the short access time for the first directory, the first signal may be referred to as an early miss signal.

If the first directory does include an entry for the first portion, then data from the cache may be selected using results from the access to the first directory at step 608. As above, because the first directory is smaller and may be accessed more quickly than a larger directory, the selection of data from the cache may be performed more quickly. Thus, the cache access may be completed more quickly than in a system which utilizes a larger unified directory.

In some cases, because selection of data from the cache is performed using one portion of an address (e.g., higher order bits of the address), the data selected from the cache may not match the data requested by the program being executed. For example, two addresses may have the same higher order bits, while the lower order bits may be different. If the selected data has an address with different lower order bits than the lower order bits of the address for the requested data, then the selected data may not match the requested data. Thus, in some cases, the selection of data from the cache may be considered speculative, because there is a good probability, but not an absolute certainty, that the selected data is the requested data.

In one embodiment, a second directory for the cache may be used to verify that correct data has been selected from the cache. For example, the second directory may be accessed with a second portion of the address at step 610. At step 622, a determination may be made of whether the second directory includes an entry corresponding to the second portion of the address which matches the entry from the first directory. For example, the entries in the first directory and second directory may have appended tags or may be stored in corresponding locations in each directory, thereby indicating that the entries correspond to a single, matching address comprising the first portion of the address and the second portion of the address.

If the second directory does not include a matching entry corresponding to the second portion of the address, then a second signal indicating a cache miss may be asserted at step 626. Because the second signal may be asserted even when the first signal described above is not asserted, the second signal may be referred to as a late cache miss signal. The second signal may be used at step 628 to send a request to fetch the requested data from higher levels of cache memory such as the L2 cache 112. The second signal may also be used to prevent the incorrectly selected data from being stored to another memory location, stored in a register, or used in an operation. The requested data may be provided from the higher level of cache memory at step 630.

If the second directory does include a matching entry corresponding to the second portion of the address, then a third signal may be asserted at step 614. The third signal may verify that the data selected using the first directory matches the requested data. At step 616, the selected data for the cache access request may be provided from the cache. For example, the selected data may be used in an arithmetic operation, stored to another memory address, or stored in a register.

With respect to the steps of the process 600 depicted in FIG. 6 and described above, the order provided is merely exemplary. In general, the steps may be performed in any appropriate order. For example, with respect to providing the selected data (e.g., for use in a subsequent operation), the selected data may be provided after the first directory has been accessed but before the selection has been verified by the second directory. If the second directory indicates that the selected and provided data is not the requested data, then subsequent steps may be taken to undo any actions performed with the speculatively selected data as known to those skilled in the art. Furthermore, in some cases, the second directory may be accessed before the first directory.

In some cases, as described above, multiple addresses may have the same higher or lower order bits. Accordingly, the first directory may have multiple entries which match a given portion of the address (e.g., the higher or lower order bits, depending on how the first and second directories are configured). In one embodiment, where the first directory includes multiple entries which match a given portion of the address for requested data, one of the entries from the first directory may be selected and used to select data from the cache. For example, the most recently used of the multiple entries in the first directory may be used to select data from the cache. The selection may then be verified later to determine if the correct entry for the address of the requested data was used.

If the selection of an entry from the first directory was incorrect, one or more other entries may be used to select data from the cache and determine if the one or more other entries match the address for the requested data. If one of the other entries in the first directory matches the address for the requested data and is also verified with a corresponding entry from the second directory, then the selected data may be used in subsequent operations. If none of the entries in the first directory match with entries in the second directory, then a cache miss may be signaled and the data may be fetched from higher levels of the cache memory hierarchy.

Figure 7:
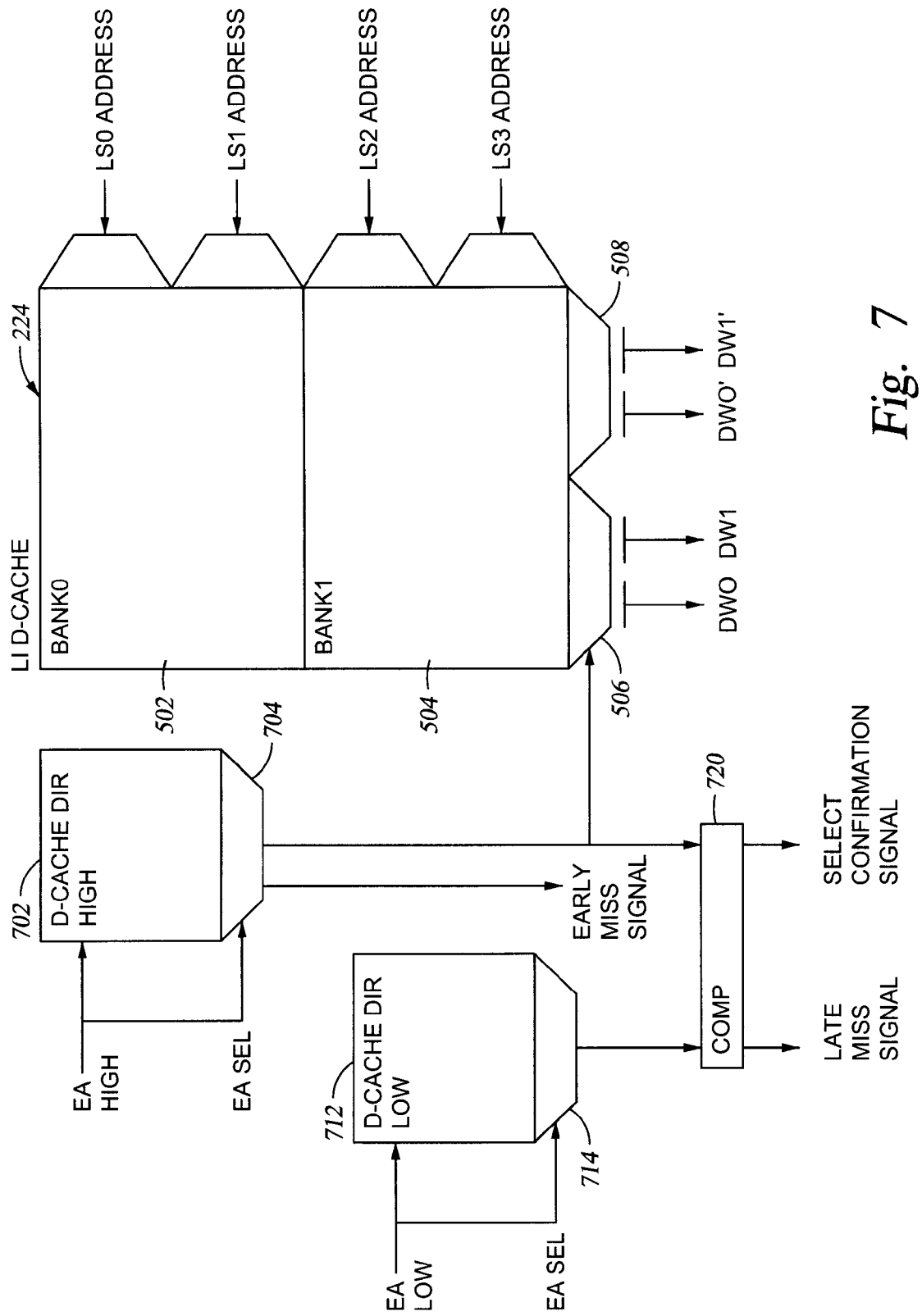
FIG. 7 is a block diagram depicting a split cache directory according to one embodiment of the invention.

FIG. 7 is a block diagram depicting a split cache directory including a first D-cache directory 704 and a second D-cache directory 712 according to one embodiment of the invention. In one embodiment, the first D-cache directory 702 may be accessed with higher order bits of an effective address (EA High) while the second D-cache directory 712 may be accessed with the lower order bits of the effective address (EA Low). As mentioned above, embodiments may also be used where the first and second D-cache directories 702, 712 are accessed using real addresses. The first and second D-cache directories 702, 712 may also be direct-mapped, set associative, or fully associative. The directories 702, 712 may include selection circuitry 704, 714 which is used to select data entries from the respective directory 702, 712.

As described above, during an access to the L1 D-cache 224, a first portion of the address for the access (EA High) may be used to access the first D-cache directory 702. If the first D-cache directory 702 includes an entry corresponding to the address, then the entry may be used to access the L1 D-cache 224 via selection circuitry 506, 508. If the first D-cache directory 702 does not include an entry corresponding to the address, then a miss signal, referred to as the early miss signal, may be asserted as described above. The early miss signal may be used, for example, to initiate a fetch from higher levels of the cache memory hierarchy and/or generate an exception indicating the cache miss.

During the access, a second portion of the address for the access (EA Low) may be used to access the second D-cache directory 712. Any entry from the second D-cache directory 712 corresponding to the address may be compared to the entry from the first D-cache directory 720 using comparison circuitry 720. If the second D-cache directory 712 does not include an entry corresponding to the address, or if the entry from the second D-cache directory 712 does not match the entry from the first D-cache directory 702, then a miss signal, referred to as the late miss signal, may be asserted. If, however, the second D-cache directory 712 does include an entry corresponding to the address and if the entry from the second D-cache directory 712 does match the entry from the first D-cache directory 702, then a signal, referred to as the select confirmation signal, may be asserted, indicating that the selected data from the L1 cache 224 does correspond to the address of the requested data.

Figure 8:
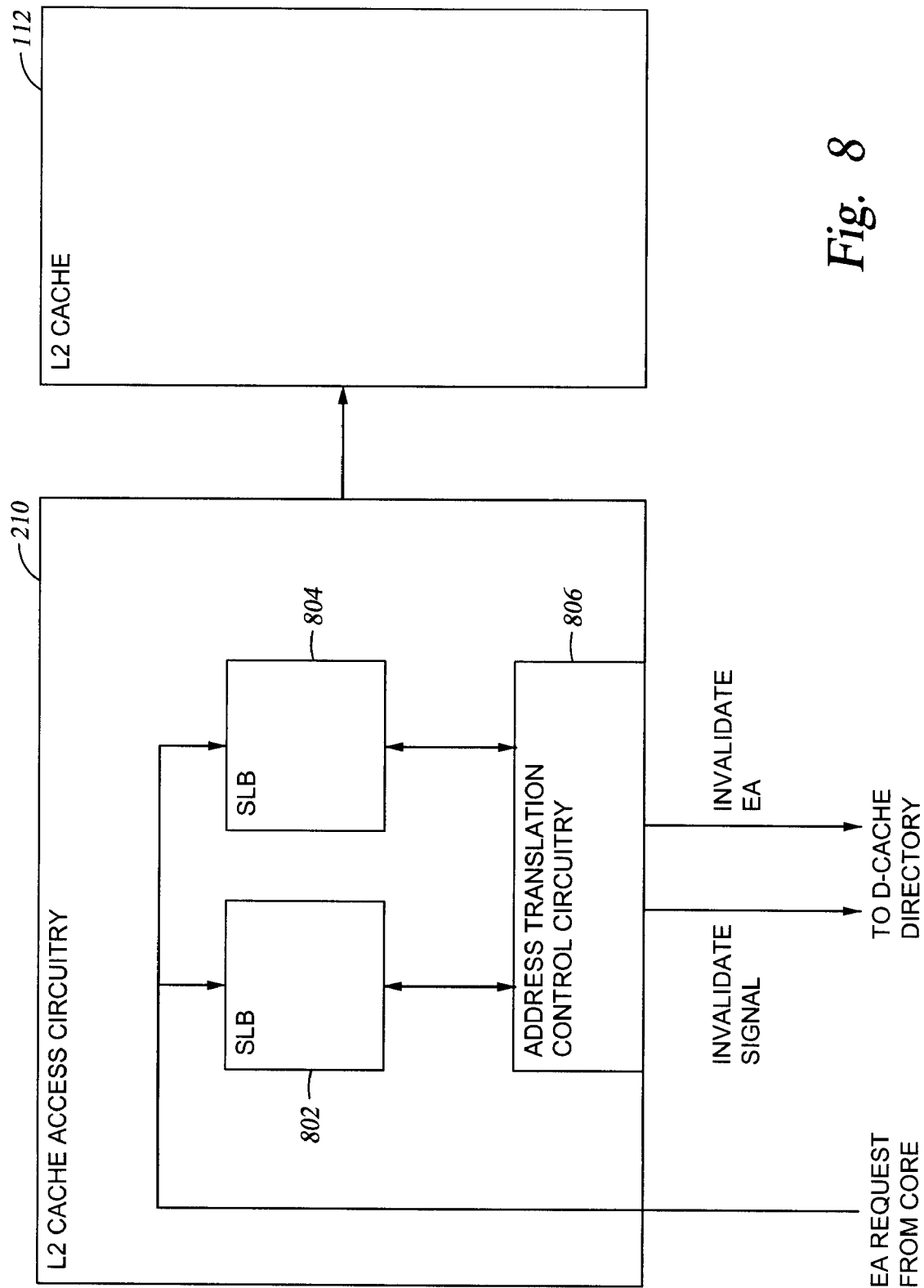
FIG. 8 is a block diagram depicting cache access circuitry according to one embodiment of the invention.

FIG. 8 is a block diagram depicting cache access circuitry according to one embodiment of the invention. As described above, where requested data is not located in the L1 cache 116, a request for the data may be sent to the L2 cache 112. Also, in some cases, the processor 110 may be configured to prefetch instructions into the L1 cache 116, e.g., based on a predicted execution path of a program being executed by the processor 110. Thus, the L2 cache 112 may also receive requests for data to be prefetched and placed into the L1 cache 116.

In one embodiment, a request for data from the L2 cache 112 may be received by the L2 cache access circuitry 210. As described above, in one embodiment of the invention, the processor core 114 and L1 cache 116 may be configured to access data using the effective addresses for the data, while the L2 cache 112 may be accessed using real addresses for the data. Accordingly, the L2 cache access circuitry 210 may include address translation control circuitry 806 which may be configured to translate effective addresses received from the core 114 to real addresses. For example, the address translation control circuitry may use entries in a segment lookaside buffer 802 and/or translation lookaside buffer 804 to perform the translations. After the address translation control circuitry 806 has translated a received effective address into a real address, the real address may be used to access the L2 cache 112.

As described above, in one embodiment of the invention, to ensure that threads being executed by the processor core 114 access correct data while using the effective address of the data, the processor 110 may ensure that every valid data line in the L1 cache 116 is mapped by a valid entry in the SLB 802 and/or TLB 804. Thus, when an entry is cast out from or invalidated in one of the lookaside buffers 802, 804, the address translation control circuitry 806 may be configured to provide an effective address (invalidate EA) of the line from the respective lookaside buffer 802, 804 as well as an invalidate signal indicating that the data lines, if any, should be removed from the L1 cache 116 and/or L1 cache directory (e.g., from the I-cache directory 223 and/or D-cache directory 225).

In one embodiment, because the processor 110 may include multiple cores 114 which do not use address translation for accessing respective L1 caches 116, energy consumption which would otherwise occur if the cores 114 did perform address translation may be reduced. Furthermore, the address translation control circuitry 806 and other L2 cache access circuitry 210 may be shared by each of the cores 114 for performing address translation, thereby reducing the amount of overhead in terms of chip space (e.g., where the L2 cache 112 is located on the same chip as the cores 114) consumed by the L2 cache access circuitry 210.

In one embodiment, the L2 cache access circuitry 210 and/or other circuitry in the nest 216 which is shared by the cores 114 of the processor 110 may be operated at a lower frequency than the frequency of the cores 114. Thus, for example, the circuitry in the nest 216 may use a first clock signal to perform operations while the circuitry in the cores 114 may use a second clock signal to perform operations. The first clock signal may have a lower frequency than the frequency of the second clock signal. By operating the shared circuitry in the nest 216 at a lower frequency than the circuitry in the cores 114, power consumption of the processor 110 may be reduced. Also, while operating circuitry in the nest 216 may increase L2 cache access times, the overall increase in access time may be relatively small in comparison to the typical total access time for the L2 cache 112.

Figure 9:
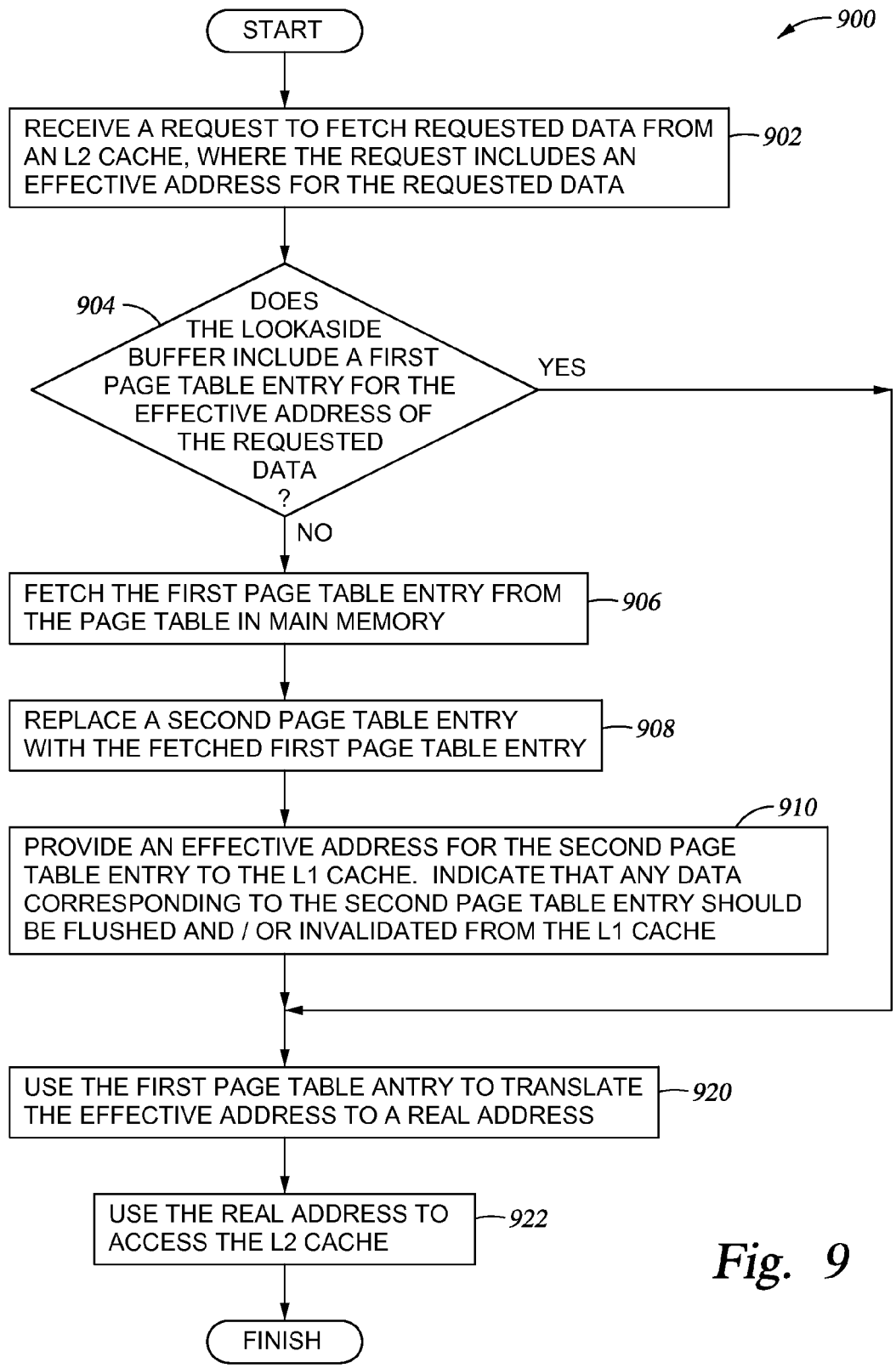
FIG. 9 is a block diagram depicting a process for accessing a cache using the cache access circuitry according to one embodiment of the invention.

FIG. 9 is a block diagram depicting a process 900 for accessing the L2 cache 112 using the cache access circuitry 210 according to one embodiment of the invention. The process 900 begins at step 902 with a request to fetch requested data from the L2 cache 112. The request may include an effective address for the requested data. At step 904, a determination may be made of whether the lookaside buffer (e.g., the SLB 802 and/or TLB 804) includes an entry for the effective address of the requested data.

At step 904 a determination may be made of whether the lookaside buffer 802, 804 includes a first page table entry for the effective address of the requested data. If the lookaside buffer 802, 804 does include a page table entry for the effective address of the requested data, then at step 920, the first page table entry may be used to translate the effective address to a real address. If, however, the lookaside buffer 802, 804 does not include a page table entry for the effective address of the requested data, then at step 906, the first page table entry may be fetched, for example, from a page table in the system memory 102.

In some cases, when a new page table entry is fetched from system memory 102 and placed in a lookaside buffer 802, 804, the new page table entry may displace an older entry in the lookaside buffer 802, 804. Accordingly, where an older page table entry is displaced, any cache lines in the L1 cache 116 corresponding to the replaced entry may be removed from the L1 cache 116 to ensure that programs accessing the L1 cache 116 are accessing correct data. Thus, at step 908, a second page table entry may be replaced with the fetched first page table entry.

At step 910, an effective address for the second page table entry may be provided to the L1 cache 116, indicating that any data corresponding to the second page table entry should be flushed and/or invalidated from the L1 cache 116. As mentioned above, by flushing and/or invalidating L1 cache lines which are not mapped in the TLB 804 and/or SLB 802, programs being executed by the processor core 114 may be prevented from inadvertently accessing incorrect data with an effective address. In some cases, a page table entry may refer to multiple L1 cache lines. Also, in some cases, a single SLB entry may refer to multiple pages including multiple L1 cache lines. In such cases, an indication of the pages to be removed from the L1 cache may be sent to the processor core 114 and each cache line corresponding to the indicated pages may be removed from the L1 cache 116. Furthermore, where an L1 cache directory (or split cache directory) is utilized, any entries in the L1 cache directory corresponding to the indicated pages may also be removed. At step 920, when the first page table entry is in the lookaside buffer 802, 804, the first page table entry may be used to translate the effective address of the requested data to a real address. Then, at step 922, the real address obtained from the translation may be used to access the L2 cache 112.

In general, embodiments of the invention described above may be used with any type of processor with any number of processor cores. Where multiple processor cores 114 are used, the L2 cache access circuitry 210 may provide address translations for each processor core 114. Accordingly, when an entry is cast out of the TLB 804 or SLB 802, signals may be sent to each of the L1 caches 116 for the processor cores 114 indicating that any corresponding cache lines should be removed from the L1 cache 116.

While the foregoing is directed to embodiments of the present invention, other and further embodiments of the invention may be devised without departing from the basic scope thereof, and the scope thereof is determined by the claims that follow.

What is claimed is:

1. A method of accessing a processor cache, the method comprising:
    executing an access instruction in a processor core of the processor, wherein the access instruction provides an untranslated effective address corresponding to data to be accessed by the access instruction;
    determining whether the level one cache includes the data to be accessed by the access instruction, comprising:
        determining whether the first directory of the level one cache includes an entry for a first portion of the effective address; and
        upon determining that the first directory for the level one cache includes the entry for the first portion of the effective address, determining whether a second directory of the level one cache includes an entry for a second portion of the effective address;
    providing the data to be accessed by the access instruction from the level one cache upon determining that the level one cache includes the data; and
    transmitting a request to a level two cache of the processor core to retrieve the data to be accessed by the access instruction upon determining that the level one cache does not include the data, wherein the effective address is translated to a real address via a translation lookaside buffer.

2. The method of claim 1, further comprising determining whether the level two cache includes the data to be accessed by the access instruction, wherein the real address is used to determine whether the level two cache includes the data to be accessed by the access instruction.

3. The method of claim 2, wherein the translation lookaside buffer includes an entry for the effective address indicating at least a portion of the corresponding real address.

4. The method of claim 3, wherein, for each valid line of data in the level one cache, the translation lookaside buffer includes a corresponding entry indicating a data effective address and a corresponding data real address for the line of data.

5. A processor comprising:
a processor core;
a level one cache; and
circuitry configured to:
   execute an access instruction in the processor core of the processor, wherein the access instruction provides an untranslated effective address corresponding to data to be accessed by the access instruction;
   determine whether the level one cache includes the data to be accessed by the access instruction, comprising:
      determining whether the first directory of the level one cache includes an entry for a first portion of the effective address; and
      upon determining that the first directory for the level one cache includes the entry for the first portion of the effective address, determining whether a second directory of the level one cache includes an entry for a second portion of the effective address;
   provide the data to be accessed by the access instruction from the level one cache upon determining that the level one cache includes the data; and
   transmit a request to a level two cache of the processor core to retrieve the data to be accessed by the access instruction upon determining that the level one cache does not include the data, wherein the effective address is translated to a real address via a translation lookaside buffer.

6. The processor of claim 5, wherein the level two cache is configured to determine whether the level two cache includes the data to be accessed by the access instruction, and wherein the real address is used to determine whether the level two cache includes the data to be accessed by the access instruction.

7. The processor of claim 6, wherein the translation lookaside buffer includes an entry for the effective address indicating at least a portion of the corresponding real address.

8. The processor of claim 7, wherein, for each valid line of data in the level one cache, the translation lookaside buffer includes a corresponding entry indicating a data effective address and a corresponding data real address for the line of data.

9. A processor comprising:
a processor core;
a level one cache;
a level two cache;
a translation lookaside buffer, wherein the translation lookaside buffer includes a corresponding entry indicating a data effective address and a corresponding data real address for each valid line of data in the level one cache; and
level one cache circuitry configured to:
   execute an access instruction in the processor core of the processor, wherein the access instruction provides an untranslated effective address corresponding to data to be accessed by the access instruction;
   determine whether the level one cache includes the data to be accessed by the access instruction, comprising:
      determining whether the first directory of the level one cache includes an entry for a first portion of the effective address; and
      upon determining that the first directory for the level one cache includes the entry for the first portion of the effective address, determining whether a second directory of the level one cache includes an entry for a second portion of the effective address;
   provide the data to be accessed by the access instruction from the level one cache upon determining that the level one cache includes the data; and
   transmit a request to a level two cache of the processor core to retrieve the data to be accessed by the access instruction upon determining that the level one cache does not include the data, wherein the effective address is translated to a real address via a translation lookaside buffer.

10. The processor of claim 9, wherein the level two cache circuitry is configured to determine whether the level two cache includes the data to be accessed by the access instruction, and wherein the real address is used to determine whether the level two cache includes the data to be accessed by the access instruction.

11. The processor of claim 10, wherein translating the effective address into a real address comprises:
accessing the translation lookaside buffer, wherein the translation lookaside buffer includes an entry for the effective address indicating at least a portion of the corresponding real address.

* * * * *